(12) United States Patent
Knowles et al.

(10) Patent No.: US 6,834,835 B1
(45) Date of Patent: Dec. 28, 2004

(54) TELESCOPIC WING SYSTEM

(75) Inventors: Gareth Knowles, Williamsport, PA (US); Ross W. Bird, Canton, PA (US)

(73) Assignee: QorTek, Inc., Williamsport, PA (US)

(*) Notice: Subject to any disclaimer, the term of this patent is extended or adjusted under 35 U.S.C. 154(b) by 0 days.

(21) Appl. No.: 10/799,400

(22) Filed: Mar. 12, 2004

(51) Int. Cl.$^7$ .................................................. B64C 3/00
(52) U.S. Cl. ..................... 244/198; 244/201; 244/218; 244/46
(58) Field of Search .................. 244/35 R, 198, 244/201, 218, 46

(56) References Cited

U.S. PATENT DOCUMENTS

| | | |
|---|---|---|
| 1,772,815 A | 8/1930 | Mandrich |
| 1,982,242 A | 11/1934 | Bellanca |
| 2,038,337 A | 4/1936 | Ballmann |
| 2,056,188 A | 10/1936 | Hayden |
| 2,076,059 A | 4/1937 | Asbury |
| 2,249,729 A | 7/1941 | Fitzurka |
| 2,260,316 A | 10/1941 | Harris |
| 2,292,613 A | 8/1942 | Chapman |
| 2,344,044 A | 3/1944 | Koch |
| 2,420,433 A | 5/1947 | Kraaymes |
| 2,423,095 A | 7/1947 | Gibson |
| 2,487,465 A | 11/1949 | Murray |
| 2,550,278 A | 4/1951 | Makhonime |
| 2,743,072 A | 4/1956 | Emmi |
| 2,858,091 A | 10/1958 | Kapenkin |
| 3,672,608 A | 6/1972 | Gioia et al. |
| 4,181,277 A | 1/1980 | Gerhardt |
| 4,691,881 A | 9/1987 | Gioia |
| 4,824,053 A | 4/1989 | Sarh |
| 6,151,897 A | 11/2000 | Baumbick |
| 6,367,250 B1 * | 4/2002 | Baumbick .................... 60/527 |
| 6,394,397 B1 | 5/2002 | Ngo et al. |
| 6,499,952 B1 | 12/2002 | Jacot et al. |
| 6,588,709 B1 | 7/2003 | Dunne et al. |
| 6,699,015 B2 * | 3/2004 | Villhard .................... 416/96 A |
| 6,705,868 B1 * | 3/2004 | Schleppenbach et al. ... 434/114 |

* cited by examiner

Primary Examiner—J. Woodrow Eldred
(74) Attorney, Agent, or Firm—Michael Crilly, Esq.

(57) ABSTRACT

The present invention is a wing having telescoping segments deployed via an actuator composed of a heat activated material. The actuator is a coiled tube of shape memory alloy (SMA) with large force-displacement characteristics activated thermally by either a fluid or an electrical charge. Actuator motion extends an inner wing segment from an outer wing segment when the coiled tube is compressed. Compression is achieved by heating the coiled tube so as to cause a phase transformation from Martensite to Austenite. The inner wing segment may be retracted by a mechanical device or second SMA coil when the coiled tube is cooled and returned to its Martensite phase.

16 Claims, 7 Drawing Sheets

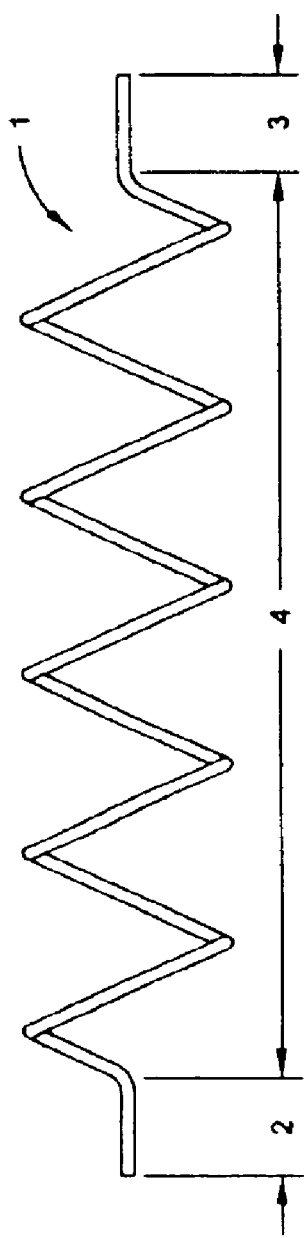
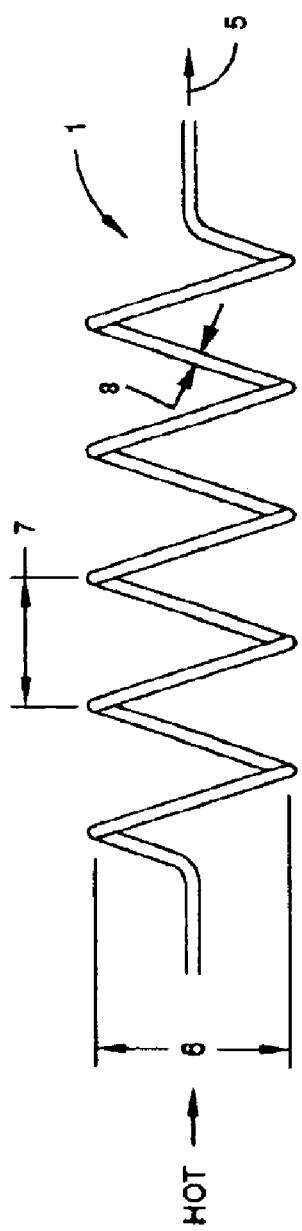
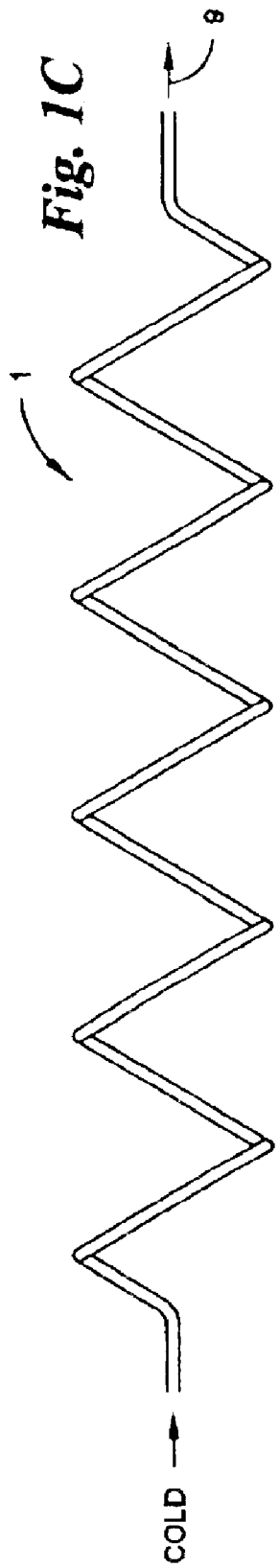
Fig. 1A
Fig. 1B
Fig. 1C

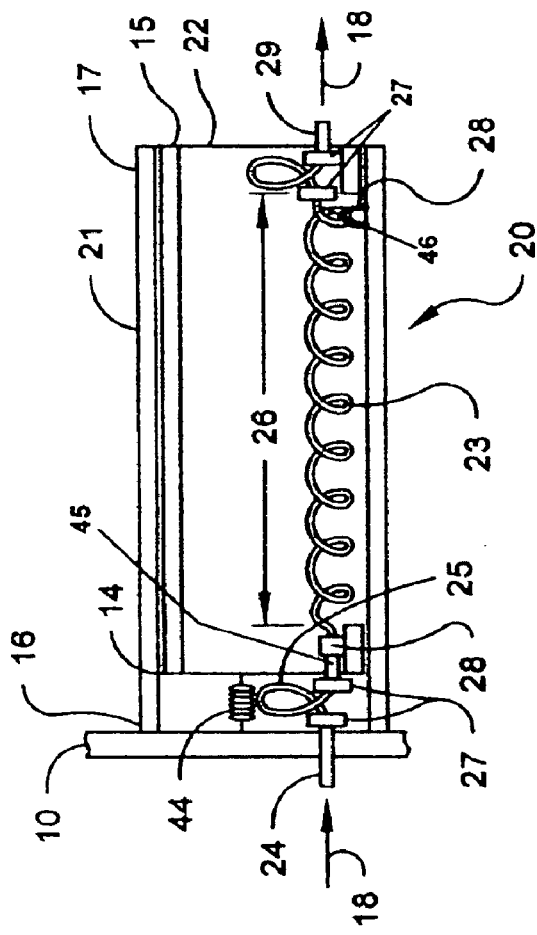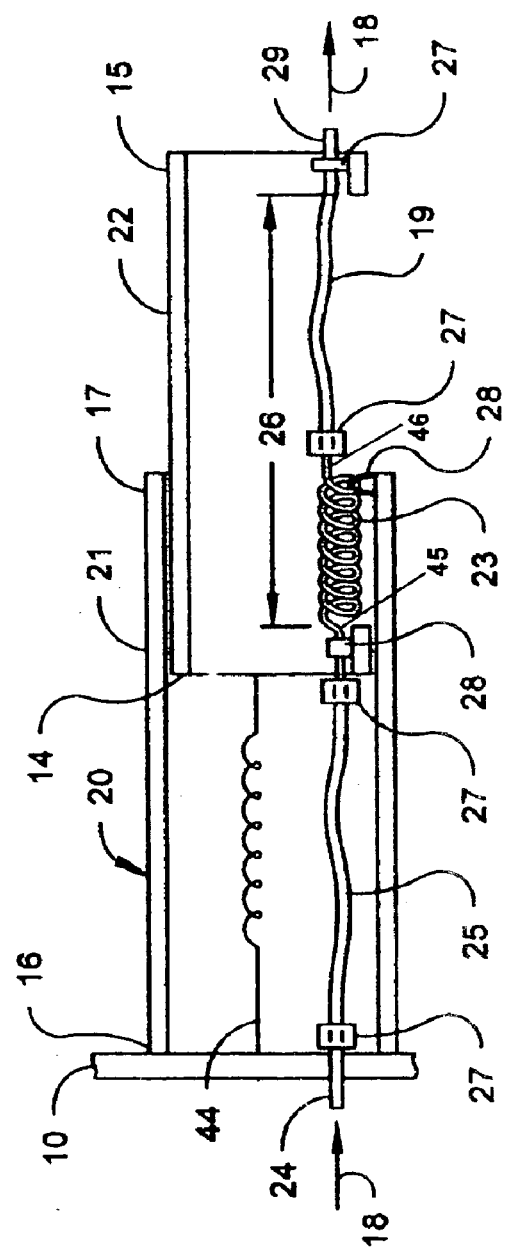

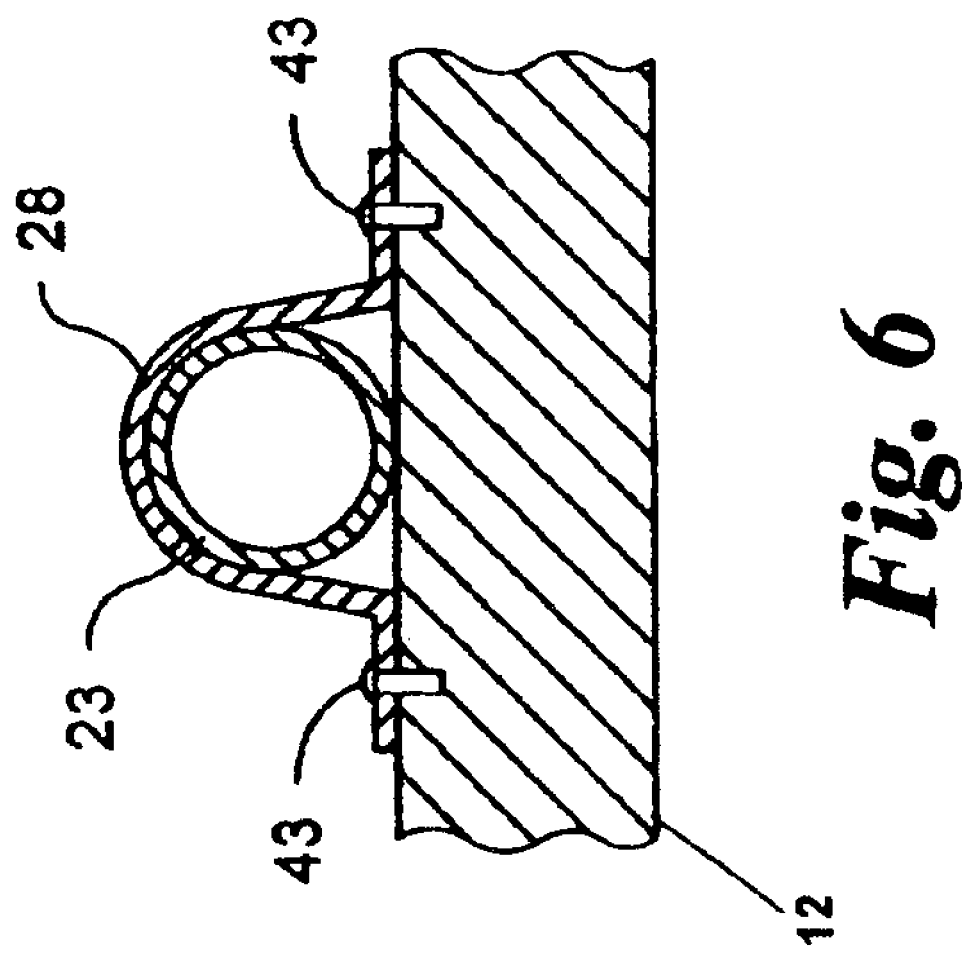

TELESCOPIC WING SYSTEM

FEDERALLY SPONSORED RESEARCH OR DEVELOPMENT

The United States Government has a paid-up license in this invention and the right in limited circumstances to require the patent owner to license others on reasonable terms as provided for by the terms of Contract No. F08630-03-C-0127 awarded by the United States Air Force.

CROSS REFERENCE TO RELATED APPLICATIONS

None.

BACKGROUND OF THE INVENTION

1. Field of the Invention

The present invention generally relates to an airfoil with a variable or adjustable lift surface. Specifically, the invention is a wing having one or more telescoping segments deployed via an actuator composed of a material responsive to heat supplied by a fluid or electrically.

2. Background

A telescopic or variable area wing is a device having one or more segments of progressively smaller cross section. It is widely known that such devices improve aerodynamic performance and reduce the total volume required for wing stowage.

The related arts include a variety of telescopic wing geometries and deployment mechanisms. Several noteworthy inventions are reviewed below.

Sarh, U.S. Pat. No. 4,824,053, describes and claims a telescopic airfoil with tubular spars. Spars are threaded and telescoping when rotated so as to move in a linear fashion thereby extending and retracting wing segments.

Gerhardt, U.S. Pat. No. 4,181,277, describes and claims a movable wing externally mounted to slide along the trailing edge of a stationary wing. The wing segment is extended and retracted by a single screw jack with traveling nut mounted to the structure on the fuselage centerline above the wing. Screw jack is operated by a hydraulic motor powered by a source of hydraulic fluid driving through a common gearbox.

Gioia et al., U.S. Pat. No. 3,672,608, describes and claims a hydraulic mechanism for supporting a telescopically mounted wing section of an extendible aircraft wing. Hydraulic cylinders, fixedly attached to a telescopic wing section, are in slidable or rolling contact with the other wing section via pistons. The inner wing section is extended from the outer wing section by means of a pair of screw jacks.

Kapenkin, U.S. Pat. No. 2,858,091, describes and claims a retractable wing having a pair of motor driven threaded rods. Threaded rods engage threaded bushings at one end of each of the retractable wings.

Enmi, U.S. Pat. No. 2,743,072, describes and claims a collapsible wing system for aircraft. Wing segments are extended and retracted via a hydraulic means comprising an end closed cylinder and a series of telescopic sleeves each having an external diameter similar to the internal diameter of its adjacent inboard sleeve. Each telescopic sleeve is joined to a wing segment so as to couple sleeve movement to wing segment movement.

Makhonine, U.S. Pat. No. 2,550,278, describes and claims a variable surface wing having an inner wing segment with four spars fixed lengthwise along the wing. Movement of the spars and wing segment attached thereto is achieved via guiding rollers.

Murray, U.S. Pat. No. 2,487,465, describes and claims a variable area wing having an I-beam along its length wherein rollers allow sliding motion between wing segments. A hydraulically or electrically operated device is used to effect motion between segments.

Gibson, U.S. Pat. No. 2,423,095, describes and claims a variable area wing having a mechanically driven telescoping shaft within the wing segments. Wing segments are deployed and retracted via the telescoping shaft.

Kraaymes, U.S. Pat. No. 2,420,433, describes and claims a variable area wing having panels extended or retracted via screws, worm, chain, hydraulic piston, or gear segments and spurs. Power for retracting and extending the wings may be supplied manually, electrically, hydraulically, or by engine power.

Koch, U.S. Pat. No. 2,344,044, describes and claims an aircraft wing having stringers with rollers parallel to spars within the wing. Rollers act as bearings and guides for the movable wing extensions.

Fitzurka, U.S. Pat. No. 2,249,729, describes and claims a retractable wing tip having a pair of hydraulic reversing jacks in a paired arrangement attached to the wing tip via stems. Stems communicate movement from the hydraulic reversing jacks to the wing tips.

The referenced inventions rely upon coupled movement between mechanical elements within a control system powered by various means. Such inventions are heavy, complex, susceptible to mechanical failure, lack backup operability, and require a dedicated power source.

Shape memory alloys, also referred to as SMAs, are two-phase materials activated either thermally or electrically. SMAs, one example being. Nickel-Titanium, exhibit a phase transformation in crystal structure when cooled from a high-temperature form, known as Austenite, to a low-temperature form, known as Martensite. The temperature at which an SMA remembers its high-temperature form is adjusted by slight changes in alloy composition and through heat treatment. In Nickel-Titanium alloys, the high-temperature form can be changed from above +100 degrees Celsius to below −100 degrees Celsius. The shape recovery process occurs over a range of just a few degrees. The start or finish of the phase transformation can be controlled to within a degree or two if necessary.

A coiled SMA may be used as an actuator, as represented in FIGS. 1a–1c. For example, FIG. 1a shows a coiled SMA tube 1 comprising a coil 4 between an input lead 2 and an output lead 3. The coil 4 is easily expanded lengthwise when the SMA is in its Martensite phase. The coil 4 reverts to its Austenite phase when heated by a hot fluid 5 therein and recovers its original shape with great force, as represented in FIG. 1b. The coil 4 may be cooled by a cold fluid 9, as represented in FIG. 1c, reverting the SMA to its Martensite phase so that it is again easily deformable.

Spring-shaped elements composed of shape memory alloys are described and claimed in two patents. However, the application of a coiled SMA tube 1 for the extension and retraction of telescopic wings as claimed by the present invention herein is neither described nor claimed in the related arts.

For example, Baumbick, U.S. Pat. No. 6,367,250, describes and claims a micro-actuator comprising a coiled wire composed of shape memory alloy communicating with and moving a flapper arm to adjust flow between a pair of jet pipes. The coiled wire is energized by optical energy.

In yet another example, Baumbick, U.S. Pat. No. 6,151,897, describes and claims a micro-actuator to adjust flow between a pair of jet pipes. The coiled wire is heated along its exterior by a hot gas from a gas turbine.

Therefore, what is currently required is a mechanically simple telescopic wing that minimizes the likelihood of mechanical failure during extension and retraction of wing segments.

What is required is a mechanically simple telescopic wing having an actuator activated via fluid and electrical means so as to provide redundant control capability over extension and retraction functionality.

What is require is a mechanically simple telescopic wing having a lightweight actuator that facilitates extension and retraction functionality between wing segments yet minimizes power requirements therefor.

SUMMARY OF THE INVENTION

An object of the present invention is a device capable of extending and/or retracting one or more wing segments in a telescopic fashion so as to minimize the likelihood of mechanical failure.

A further object of the present invention is a device capable of extending and/or retracting one or more wing segments in a telescopic fashion when activated via a heated fluid or electrical current.

A further object of the present invention is a device capable of extending and/or retracting one or more wing segments in a telescopic fashion while minimizing power requirements therefor.

The present invention is comprised of an inner wing segment, an outer wing segment, and an actuator. The inner wing segment is telescopically disposed from within the outer wing segment. The actuator is a coiled tube composed of a shape memory alloy. The actuator is fastened to one end of the outer wing segment and to the opposite end of the inner wing segment so that the actuator is disposed in a lengthwise fashion along the length of and within the telescopic wing system. The coiled tube contracts when heated thereby extending the inner wing segment from the outer wing.

Alternate embodiments of the present invention include a resilient element, one example being a mechanical spring, fastened at one end to the inner wing segment and the other end to the telescopic wing system. The described arrangement allows the resilient element to expand when the inner wing segment is extended thereby exerting a retraction force of lesser magnitude than the actuator. The resilient element retracts the inner wing segment when the coiled tube is cooled and the actuator force is removed.

The coiled tube may be heated by a fluid, including liquids and gases, and/or an electrical current directed through the coiled tube. It is likewise possible to cool the coiled tube via a fluid. The fluid may be vented after passing through the actuator in an open loop configuration or re-circulated in a closed-loop system, with or without feedback control.

Several advantages are offered by the present invention. The invention minimizes the number of moving elements within the telescopic wing system thereby simplifying design and function, increasing reliability, and minimizing cost. The invention minimizes power requirements. The invention provides greater power density and greater trans- lational capability than comparable size electromechanical devices. The invention weighs substantially less than electromechanical devices with comparable performance. Furthermore, the invention is easily adapted to a variety of surface, air, and water craft.

BRIEF DESCRIPTION OF THE DRAWINGS

The invention will now be described in more detail, by way of example only, with reference to the accompanying drawings, in which:

FIG. 1a is an elevation view of an exemplary spring-shaped tube composed of a shape memory alloy after deformation when in its Martensite phase.

FIG. 1b is an elevation view of the tube in FIG. 1a after it is heated to its Austenite phase thereby returning to its original or pre-deformed shape.

FIG. 1c is an elevation view of the tube in FIG. 1b after it is cooled to its Martensite phase and deformed to a length exceeding that in FIG. 1a.

FIG. 4a is a partial cross sectional view of a telescopic wing showing a coiled SMA actuator in its Martensite phase attached to both outer and inner wings and fluid communicated to the actuator via an open-loop system.

FIG. 4b is a partial cross sectional view of a telescopic wing showing a coiled SMA actuator in its Austenite phase with inner wing extended and fluid communicated to the actuator via an open-loop system.

FIG. 6 is a cross sectional view of an exemplary attachment scheme for securing a coiled SMA actuator to a wing structure.

REFERENCE NUMERALS

Figure 2:
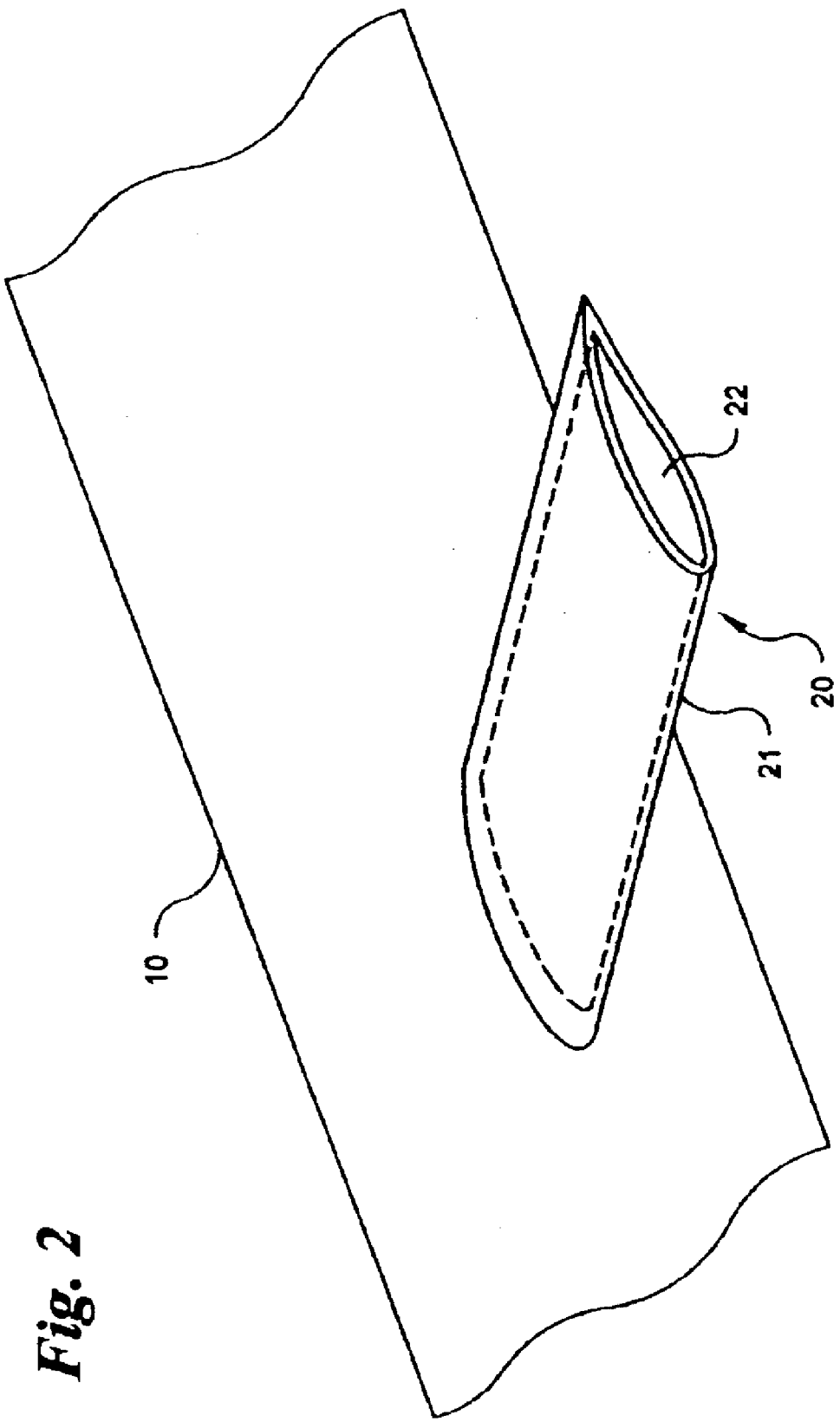
FIG. 2 is a perspective view showing an exemplary telescopic wing in its retracted form attached to a fuselage.

1 Coiled SMA tube
2 Input lead
3 Output lead
4 Coil
5 Hot fluid
6 Mean diameter, D
8 Tube diameter, d
9 Cold fluid
10 Structure
11 Vehicle
12 Wing wall
13 Return tube
14 First end
15 Second end
16 First end
17 Second end
18 Fluid 19 Flexible tube
20 Telescopic wing system
21 Outer wing segment
22 Inner wing segment
23 Coiled SMA actuator
24 Inlet control valve
25 Flexible tube
26 Slot
27 Coupler
28 Bracket
29 Vent tube
30 Source
31 Left side
32 Right side
33 Regulator
34 Outer wing segment
35 Coiled SMA actuator
36 Inner wing segment
37 Sensor
38 Controller
39 Input stimulus
40 Adjustment command
41 Vent
42 Return
43 Fastener
44 Resilient element
45 Input lead
46 Output lead

DESCRIPTION OF THE INVENTION

Figure 3:
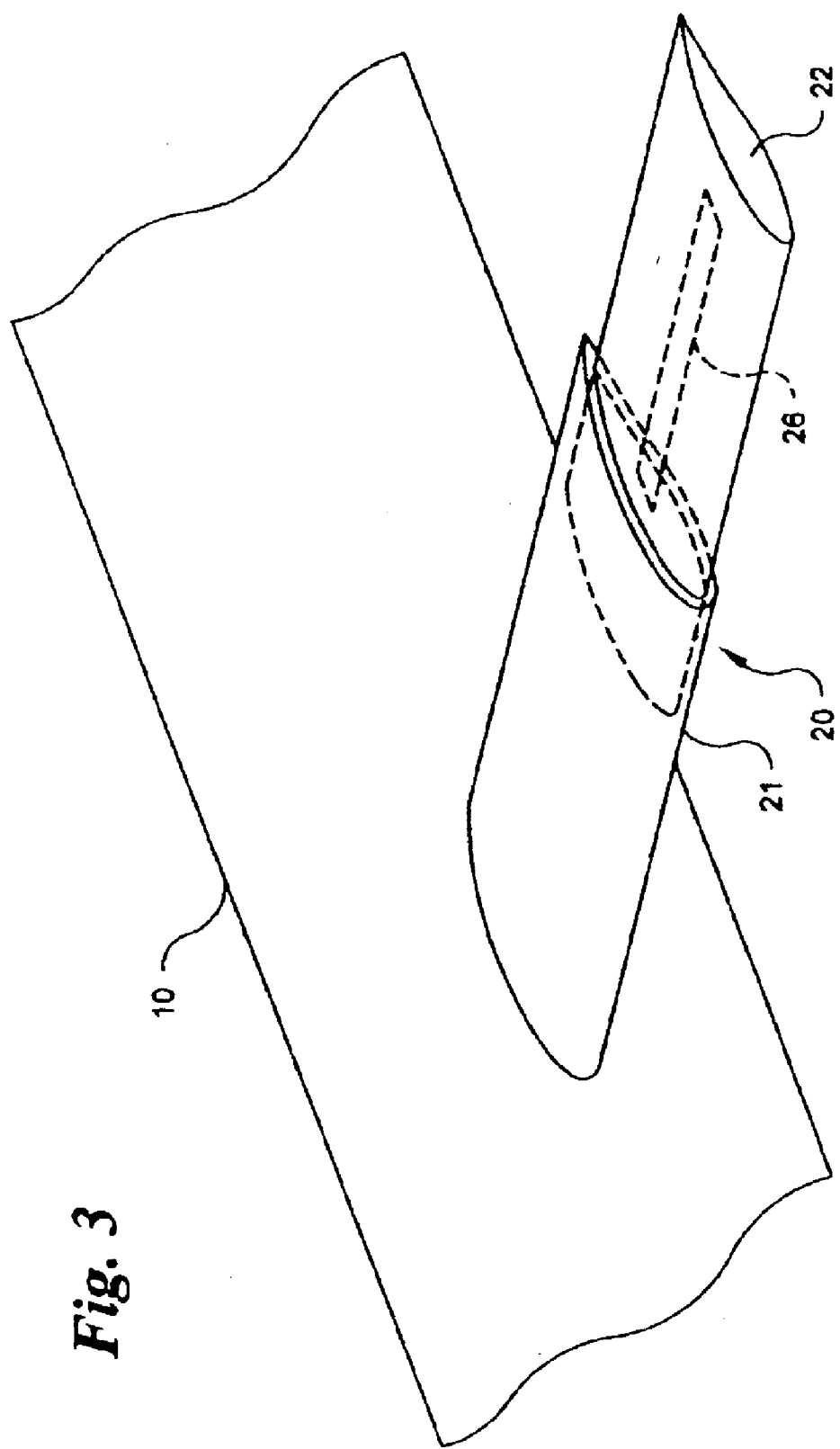
FIG. 3 is a perspective view showing an exemplary telescopic wing in its extended form attached to a fuselage.

Referring now to FIGS. 2 and 3, an exemplary telescopic wing system 20 of the present invention is shown retracted and extended from a structure 10, respectively. The telescopic wing system 20 is shown having an inner wing segment 22 slidably disposed within and surrounded by an outer wing segment 21. The inner wing segment 22 resides opposite of the structure 10 about the outer wing segment 21 when deployed. Exemplary structures 10 include but are not limited to a fuselage, hull, and pressure hull. While the present invention is described having two segments, it is likewise possible for the described telescopic wing system 20 to include three or more such segments.

Figure 5A:
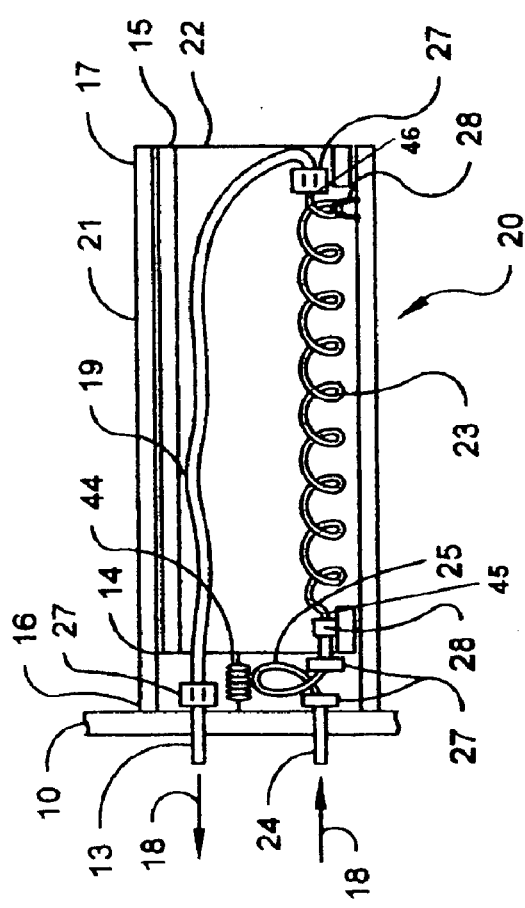
FIG. 5a is a partial cross sectional view of a telescopic wing showing a coiled SMA actuator in its Martensite phase attached to both outer and inner wings and fluid communicated to the actuator via a closed-loop system.

Referring now to FIGS. 4a and 5a, the interior of the telescopic wing system 20 is shown having an inner wing segment 22 of lesser dimensional extent than the outer wing segment 21 and residing within the cavity formed by the outer wing segment 21. A coiled SMA actuator 23 is shown in its elongated, Martensite phase within the interior of the inner wing segment 22. One end of the coiled SMA actuator 23 is fastened via a bracket 28 to the inner wing segment 22 adjacent to the first end 14. The opposite end of the coiled SMA actuator 23 is fastened via a bracket 28 to the outer wing segment 21 adjacent to the second end 17. A slot 26 is provided along the inner wing segment 22 so as to allow attachment of the coiled SMA actuator 23 to the interior of the outer wing segment 21. An input lead 45 at one end of the coiled SMA actuator 23 is attached to a flexible tube 25 via a coupler 27, said elements preferably composed of a heat resistant material. The opposite end of the flexible tube 25 is attached to an inlet control valve 24, a non-limiting example being a piezoelectric valve controlled by a microcontroller, via a coupler 27. The inlet control valve 24 communicates fluid 18 from a source, non-limiting examples including a turbine engine and a hydraulic system. Likewise, the output lead 46 at the opposite end of the coiled SMA actuator 23 is attached to a flexible tube 19 via a coupler 27.

Fluid 18 may be either vented to the exterior of the telescopic wing system 20 or re-circulated so as to pass through the coiled SMA actuator 23 multiple times. In FIG. 4a, the opposite end of the flexible tube 19 is attached to a vent tube 29, via a coupler 27, passing through and fastened to the inner wing segment 22 at the second end 15. The described arrangements permits fluid 18 passing through the coiled SMA actuator 23 to exit the vent tube 29. In FIG. 5a, the opposite end of the flexible tube 19 is attached to a return tube 13, via a coupler 27, passing through and fastened to the structure 10 adjacent to the first end 16. The described arrangement allows fluid 18 passing through the coiled SMA actuator 23 to be reused to further heat or cool the coiled SMA actuator 23. It is likewise preferred that flexible tube 19, return tube 13, and vent tube 29 be composed of a heat resistant material.

Figure 5B:
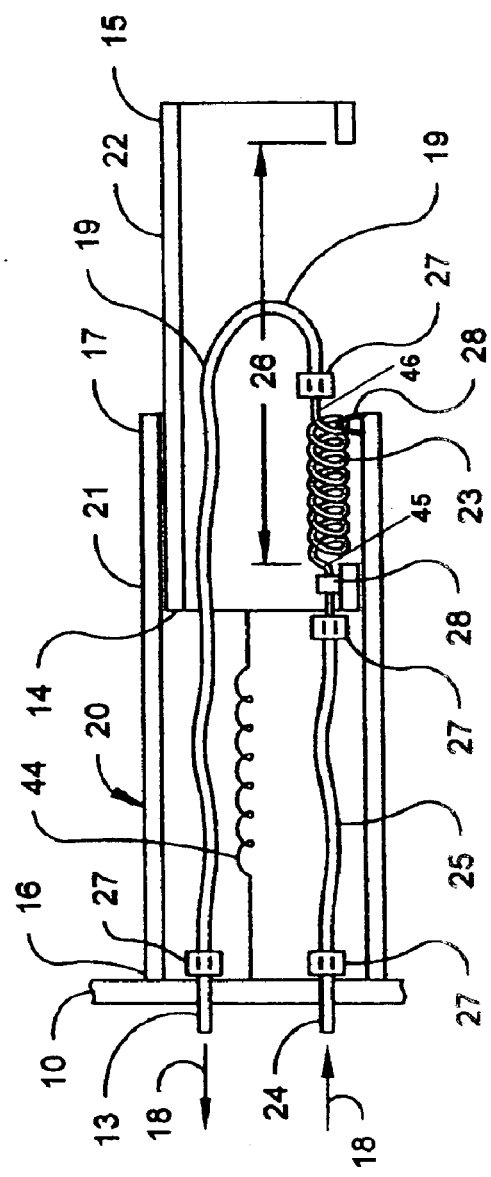
FIG. 5b is a partial cross sectional view of a telescopic wing showing a coiled SMA actuator in its Austenite phase with inner wing extended and fluid communicated to the actuator via a closed-loop system.

Referring now to FIGS. 4b and 5b, the inner wing segment 22 is shown fully extended from the outer wing segment 21 due to compression of the coiled SMA actuator 23. A slot 26, as shown in FIGS. 1, 4a, 4b, 5a, and 5b, is provided along the length of the inner wing segment 22 so as to allow unimpeded sliding motion between inner wing segment 22 and outer wing segment 21 adjacent to the coiled SMA actuator 23. The flexible tube 25 should be of sufficient length or extendible so as to accommodate increased distance between input lead 45 and input control valve 24 during extension, as represented in FIGS. 4b and 5b. The flexible tube 19 should also be of sufficient length or extendible so as to accommodate increased distance between output lead 46 and vent tube 29 resulting from extension of the open loop embodiment, as represented in FIG. 4b. The flexible tube 19 should likewise be of sufficient length or extendible so as to accommodate increased distance between output lead 46 and return tube 13 resulting from extension of the closed loop embodiment, as represented in FIG. 5b.

Attachment of the coiled SMA actuator 23 to inner wing segment 22 and outer wing segment 21 should be sufficiently robust so as to resist mechanical forces generated during extension of the telescopic wing system 20 and to avoid mechanical damage to the coiled SMA actuator 23 by attachment hardware. While a variety of attachment methods and designs are applicable, a u-shaped bracket 28 was placed about the coiled SMA actuator 23 and fastened to the wing wall 12 via a pair of fasteners 43, as shown in FIG. 6.

An optional resilient element 44 may be employed in embodiments wherein retraction of the inner wing segment 22 is required. Referring again to FIGS. 4a, 4b, 5a, and 5b, a resilient element 44 is shown mechanically attached and fixed at one end to the inner wing segment 22 adjacent to the first end 14 and the opposite end fixed to the structure 10. During extension of the inner wing segment 22, the resilient element 44 expands thereby exerting a restoring force of sufficient magnitude to retract the inner wing segment 22 when the coiled SMA actuator 23 is cooled. A variety of active and passive devices are applicable to the present invention, including but not limited to a mechanical spring and SMA coil.

Fluid 18 communicated through the coiled SMA actuator 23 may include a variety of gases and liquids. For example, hot exhaust emissions from a gas turbine or other engine type may be appropriate where the telescopic wing system 20 is used in a short-lived craft, one example being an expendable surveillance drone. In multiple use or long-lived craft, examples including a plane or a submarine, exhaust emissions may be too corrosive or contain particulates so as to degrade the continuous flow of fluid 18 through the coiled SMA actuator 23 over time. In the latter applications, it may be desired to use exhaust gases or heat from the gas turbine to heat fuel or other liquid carried by the craft and thereafter directed through the coiled SMA actuator 23. It is likewise possible to use the mentioned heat sources to pre-heat air collected from outside the craft and communicated into the coiled SMA actuator 23.

In alternate embodiments, the coiled SMA actuator 23 may be heated via ceramic wells along the length of the coiled SMA actuator 23. Ceramic wells similar to those used in MEMS micro-engines are applicable since sizes smaller than the cross-section of the coiled SMA actuator 23 are possible.

In yet other embodiments, the coiled SMA actuator 23 may be heated electrically via a current. It is further possible to heat the coiled SMA actuator 23 by a resistive heating element along the interior of the coiled SMA actuator 23.

Electrical heating may also serve as a secondary or backup system to fluid-based heating so as to improve the overall reliability of the telescopic wing system 20. For example, dc power may be used to extend the inner wing segment 22 when fluid-based heating alone is not sufficient or is not operating correctly. Likewise, it is possible for the electrically-based heating system to supplement heating along selected regions of the coiled SMA actuator 23. In either embodiment, the coiled SMA actuator 23 may be electrically terminated to a power supply through a microrelay and thereafter coupled to a controller sensing either failure or limited response and applying back-up electrical power accordingly.

Figure 7:
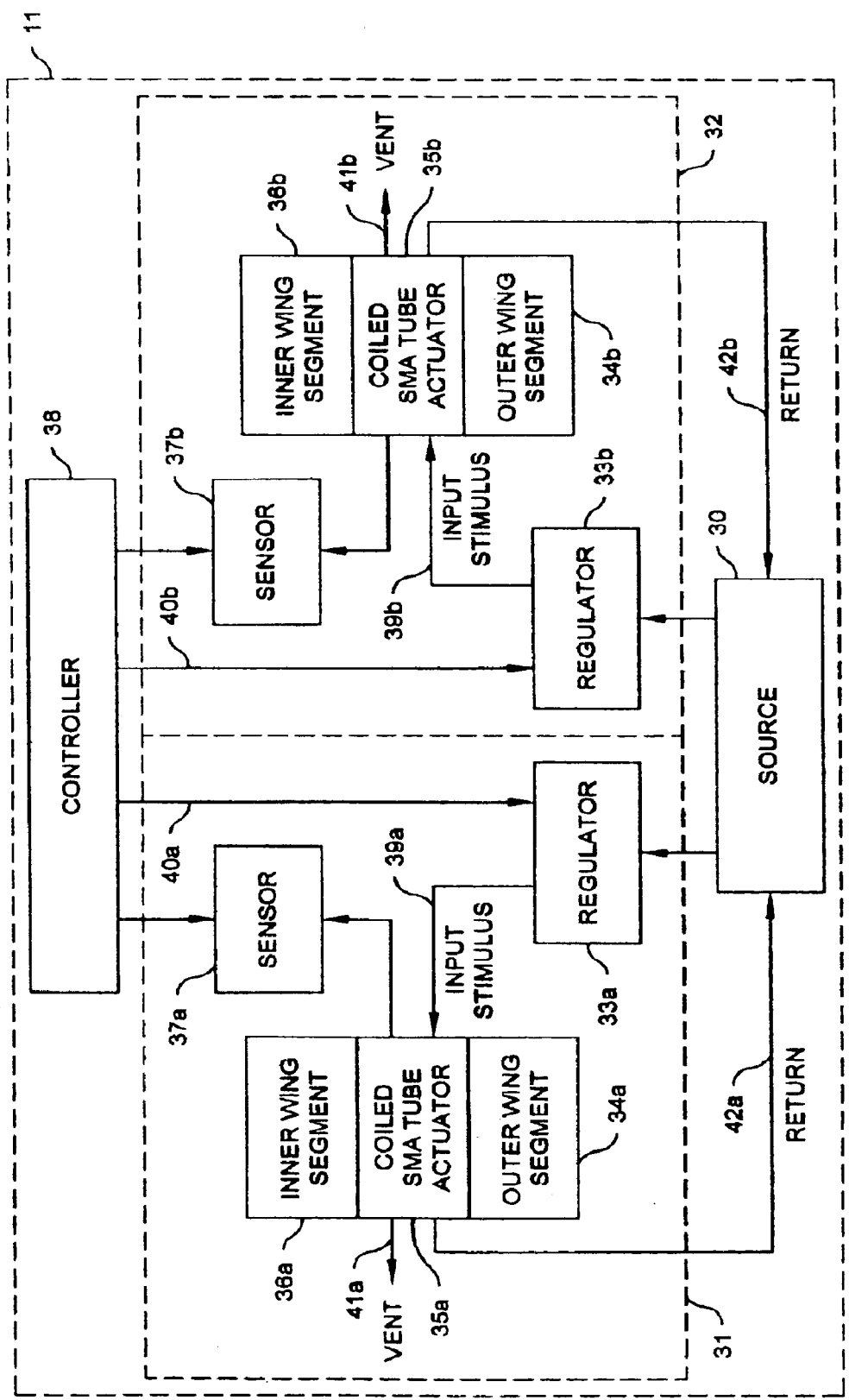
FIG. 7 is a block diagram of an exemplary embodiment of the present invention showing the control of a paired arrangement of telescopic wings.

Referring now to FIG. 7, an exemplary implementation of the present invention is shown wherein extendible wings are employed in a symmetrically arranged fashion about a left side 31 and a right side 32 of a vehicle 11. A source 30, non-limiting examples including an electric generator, engine, and compressor with external heater, communicates either a liquid or gas or current to a pair of regulators 33a, 33b. Regulators 33a, 33b may include a valve, a microprocessor controlled input control valve 24, or a power relay circuit, as described above. Each regulator 33a, 33b communicates an input stimulus 39a, 39b, either liquid, gas or electricity, into each coiled SMA actuator 35a, 35b, respectively. Thereafter, each activated coiled SMA actuator 35a, 35b contracts thereby extending an inner wing segment 36a, 36b from each outer wing segment 34a, 34b. As previously mentioned, it may be desired to provide a vent 41a, 41b when the input stimulus 39a, 39b is a liquid or gas. In alternate embodiments, it may be desired that a return 42a, 42b redirect fluid 18 to the source 30 for reuse.

In yet other embodiments, it may be desired to actively control the extendible wings in a symmetric or asymmetric fashion. An optional sensor 37a, 37b, one example being a temperature sensitive thin-film array, is used to measure the temperature of each coiled SMA actuator 35a, 35b. Measurements are communicated to a controller 38 which thereafter communicates an adjustment command 40a, 40b to each regulator 33a, 33b, an example being a 3-way piezoelectric valve, in a feedback loop architecture of sufficiently high bandwidth to achieve the desired symmetries and asymmetries.

Design Parameters—Coiled SMA Actuator 23

Design parameters are estimated for a coiled SMA actuator 23 comprising a coil 4 with an input lead 2 and an output lead 3, as described in FIGS. 1a–1c. The required displacement or stroke (δ) is the total change in length by the coil 4 between Martensite and Austenite phases. The force (P) generated as a result of the prescribed displacement or stroke (δ) is approximated by $$P = K\delta \tag{1}$$

where K is the stiffness or the force necessary to yield a unit displacement of the telescopic wing system 20 along the axial length of the coiled SMA actuator 23. Stiffness may be estimated by finite-element analysis or experimental methods understood in the art. The theory for helical-shaped SMA springs described by K. Otsuka and C. M. Wayman in the chapter entitled *Design of Shape Memory Alloy Actuators and Their Applications* in the book entitled *Shape Memory Materials* (published by Cambridge University Press, 1999) is hereby incorporated by reference.

Since force (P) represents the value required to displace the inner wing segment 22 from the outer wing segment 21, the coiled SMA actuator 23 must generate the required force between start and finish temperatures of the Austenite phase.

The primary difference between a helical coil composed of a shape memory alloy and one composed of an "ordinary" spring material is an increase in the modulus of elasticity (or shear modulus) exhibited by the SMA during its phase transformation from Martensite to Austenite. As such, standard spring design equations in *Spring Design Manual*, Second Edition (published by Society of Automotive Engineers, Inc., Warrendale, Pa.), *Roark's Formulas for Stress and Strain*, Sixth Edition (published by McGraw Hilt New York), *Design of Machine Elements*, Fourth Edition (published by Macmillan, Toronto), and *Mechanical Springs*, Second Edition (McGraw Hill, New York) are applicable with appropriate adjustment to the modulus so as to account for the phase transformation.

The displacement (δ) by the coiled SMA actuator 23 is related to the force (P) applied by the following relationship $$\delta = \frac{8PD^3 n}{Gd^4} \tag{2}$$

where D is the mean diameter 6 of the coil 4, d is the tube diameter 8 of the coil 4, n is the number of twists along the coil 4, and G is the shear modulus of the shape memory alloy. Knowing the shear modulus (G) is temperature dependent and assuming the phase transformation is complete so that the Martensite volume fraction reduces from 1.0 to 0.0, the shear modulus (G) is equal to the modulus of the Martensite phase prior to transformation ($G_L$) and to the modulus of Austenite at the end of the transformation (G).

The strength required by the shape memory alloy as a result of the developed force (P) is estimated based on the shear stress (τ) calculate by $$\tau = \frac{8PD\kappa}{\pi d^3} \tag{3}$$

where the stress correction factor (κ) is obtained by the Wahl's formula $$\kappa = \frac{4C - 1}{4C - 4} + \frac{0.615}{C} \tag{4}$$

and the spring index (C) is $$C = \frac{D}{d} \tag{5}$$

Computational Procedure—Coiled SMA Actuator 23 Without Leads 2, 3

The magnitude of the force (P) acting on the coiled SMA actuator 23 for a given displacement (δ) is calculated from Equation (1) above. The mean diameter 6, tube diameter 8, number of twists (n) are limited by the allowable shear stress (τ) and strain (γ) of the coiled SMA actuator 23. The shear strain ($\gamma_L$) in the Martensitic phase is calculated by $$\gamma_L = \frac{\tau}{G_L} \tag{6}$$

where the shear stress (τ) is the allowable value enabling the calculation of the transformation induced shear strain in the coiled SMA actuator 23. The shear strain ($\gamma_H$) in the Austenitic phase is calculated by $$\gamma_H = \frac{\tau}{G_H} \tag{7}$$

Accordingly, the shear strain (γ) accumulated as a result of the transformation is calculated by $$\gamma = \gamma_L - \gamma_N \tag{8}$$

Knowing the shear strain (γ) and two other design parameters (D, d, or n), it is possible to calculated the third by the following $$\gamma = \frac{\delta d}{\pi n D^2} \tag{9}$$

Design for Prescribed Mean Diameter 6

In some applications, the size of the mean diameter 6 may be limited by design constraints or considerations. Accordingly, the equations above are transformed to the following $$\kappa C^3 = \frac{\pi D^2 \tau}{8P} \tag{10}$$

$$n = \frac{\delta}{\pi C D \gamma} \tag{11}$$

The value of $\kappa C^3$ is calculated from equation (10) as a function of the allowable shear stress (τ) and required force (P). Graphs in the reference entitled *Design of Shape Memory Alloy Actuators and Their Applications* are used to evaluate the corresponding value of C. Thereafter, the number of twists (n) is determined from equation (11).

Accounting for Effect of Input Lead 2 and Output Lead 3

The displacement due to the input lead 2 ($\delta_1$) and the output lead 3 ($\delta_2$) may be estimated when the curvature of the leads is disregarded.

The stiffness of each lead 2, 4 is calculated by $$k_i = \frac{\pi d^2}{4} E \frac{1}{L_i} \tag{12}$$

where E is the modulus of elasticity (which varies with temperature), and L is the length of the corresponding lead 2, 4 and subscript i is 1 for the input lead 2 and 2 for the output lead 3.

Since input lead 2, coil 4, and output lead 3 are in series, the total displacement (δ) is given by $$\delta = \delta_1 + \delta_3 + \delta_2 \tag{13}$$

where $\delta_3$ is the displacement by the coil 4. Equation (13) assumes that input lead 2, coil 4, and output lead 3 are subject to and activated by temperature producing a complete phase transformation. Accordingly, since the displacement (δ) is known and the force (P) applied to the coiled SMA actuator 23 is given by Equation (12), it is possible to evaluate the displacement of the coil 4 from Equation (13) where $$\delta_s = \delta - \left| \frac{P}{k_{1L}} - \frac{P}{k_{1H}} \right| - \left| \frac{P}{k_{2L}} - \frac{P}{k_{2H}} \right| \tag{14}$$

The stiffness (κ) of the input lead 2 and output lead 3 is specified for the modulus of elasticity corresponding to either low or high temperature. The corresponding terms in the right side of Equation (13) reflect on transformation-induced displacements generated in the straight leads 2, 4, comparable to the evaluation of the shear strain in Equation (8).

Based upon the Equations above, a larger displacement (δ) is achieved by increasing the number of twists along the coil 4. When the number of twists (n) is constant, a trade-off between displacement (δ) and force (P) is generated by the coiled SMA actuator 23 suggesting that a larger displacement (δ) may be obtained where the force (P) requirement is relaxed. In general, the force (P) output by a coiled SMA actuator 23 with a constant prescribed stroke is nearly proportional to the number of twists (n). However, where the force (P) output is constant, the displacement (δ) is nearly proportional to the number of twists (n).

The description above indicates that a great degree of flexibility is offered in terms of the present invention. Although the present invention has been described in considerable detail with reference to certain preferred versions thereof other versions are possible. Therefore, the spirit and scope of the appended claims should not be limited to the description of the preferred versions contained herein.

What is claimed is:

1. A telescopic wing system comprising:
   (a) an outer wing segment;
   (b) an inner wing segment telescopically disposed from said outer wing segment, said outer wing segment and said inner wing segment each having a first end and a second end; and
   (c) an actuator comprising a coiled tube composed of a shape memory alloy, said actuator fastened to said second end of said outer wing segment and to said first end of said inner wing segment so that said actuator is disposed lengthwise in an extended fashion within said telescopic wing system, said coiled tube having a fluid therein so as to contract said actuator lengthwise when heated by said fluid and extending said inner wing segment from said outer wing segment.

2. The telescopic wing system of claim 1, wherein said fluid is a liquid.

3. The telescopic wing system of claim 2, wherein said fluid is vented after passing through said actuator.

4. The telescopic wing system of claim 2, wherein said fluid is re circulated after passing through said actuator.

5. The telescopic wing system of claim 1, wherein said fluid is a gas.

6. The telescopic wing system of claim 5, wherein said fluid is vented after passing through said actuator.

7. The telescopic wing system of claim 5, wherein said fluid is recirculated after passing through said actuator.

8. The telescopic wing system of claim 1, wherein said actuator is also controlled by an electrical current.

9. A telescopic wing system of claim 1, further comprising:
   (d) a resilient element fastened to said inner wing segment and to said telescopic wing system so that said resilient element is elongated when said inner wing segment is extended, said resilient element retracting said inner wing segment when said actuator is cooled.

10. The telescopic wing system of claim 9, wherein said fluid is a liquid.

11. The telescopic wing system of claim 10, wherein said fluid is vented after passing through said actuator.

12. The telescopic wing system of claim 10, wherein said fluid is re-circulated after passing through said actuator.

13. The telescopic wing system of claim 9, wherein said fluid is a gas.

14. The telescopic wing system of claim 13, wherein said fluid is vented after passing through said actuator.

15. The telescopic wing system of claim 13, wherein said fluid is re-circulated after passing through said actuator.

16. The telescopic wing system of claim 9, wherein said actuator is also controlled by an electrical current.

\* \* \* \* \*

UNITED STATES PATENT AND TRADEMARK OFFICE
CERTIFICATE OF CORRECTION

PATENT NO. : 6,834,835 B1
DATED : December 28, 2004
INVENTOR(S) : Knowles et al.

It is certified that error appears in the above-identified patent and that said Letters Patent is hereby corrected as shown below:

Column 2,
Line 36, delete "being." insert -- being --

Column 9,
Line 22, delete "(y)" insert -- ($\gamma$) --

Column 10,
Equation (13), delete "$\delta_3$" insert -- $\delta_s$ --
Line 5, delete "$\delta_3$" insert -- $\delta_s$ --
Line 65, delete "re circulated" insert -- re-circulated --

Column 11,
Line 4, delete "recirculated" insert -- re-circulated --

Signed and Sealed this

First Day of March, 2005

JON W. DUDAS
*Director of the United States Patent and Trademark Office*